(12) United States Patent
Phillips et al.

(10) Patent No.: US 8,105,678 B2
(45) Date of Patent: *Jan. 31, 2012

(54) STRUCTURED SURFACES THAT EXHIBIT COLOR BY ROTATION

(75) Inventors: Roger Phillips, Santa Rosa, CA (US); Vladimir P. Raksha, Santa Rosa, CA (US); Eric William Kurman, Healdsburg, CA (US); Matthew Witzman, Santa Rosa, CA (US); Neil Teitelbaum, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 580 days.

This patent is subject to a terminal disclaimer.

(21) Appl. No.: 12/151,524

(22) Filed: May 7, 2008

(65) Prior Publication Data

US 2008/0278816 A1 Nov. 13, 2008

Related U.S. Application Data

(60) Provisional application No. 60/916,355, filed on May 7, 2007, provisional application No. 61/001,240, filed on Oct. 31, 2007, provisional application No. 61/062,157, filed on Jan. 24, 2008.

(51) Int. Cl.
*B32B 3/00* (2006.01)
*B42D 15/00* (2006.01)
*G02B 5/04* (2006.01)

(52) U.S. Cl. ............... 428/172; 428/207; 359/485.06; 359/530; 283/114

(58) Field of Classification Search .......... 428/172, 428/207; 359/22, 567, 569, 576, 485.06, 359/530; 283/107, 113, 114
See application file for complete search history.

(56) References Cited

U.S. PATENT DOCUMENTS

| 5,364,689 | A | 11/1994 | Kashiwagi et al. | 428/195.1 |
|---|---|---|---|---|
| 5,763,049 | A * | 6/1998 | Frey et al. | 428/172 |
| 6,114,018 | A | 9/2000 | Phillips et al. | 428/200 |
| 6,120,636 | A * | 9/2000 | Nilsen et al. | 156/230 |
| 6,838,166 | B2 | 1/2005 | Phillips et al. | 428/323 |
| 2004/0081807 | A1* | 4/2004 | Bonkowski et al. | 428/195.1 |
| 2006/0077496 | A1* | 4/2006 | Argoitia et al. | 359/2 |
| 2006/0285184 | A1* | 12/2006 | Phillips et al. | 359/2 |

FOREIGN PATENT DOCUMENTS

| EP | 1 353 197 | 10/2003 |
|---|---|---|
| EP | 1 741 757 | 1/2007 |
| WO | WO 2005/017048 | 2/2005 |
| WO | 2007/131833 | 11/2007 |

* cited by examiner

*Primary Examiner* — Donald J Loney
(74) *Attorney, Agent, or Firm* — Matthew A. Pequignot; Pequignot+ Myers LLC

(57) ABSTRACT

An optically variable device is disclosed having a substrate with an array of pyramidal structures formed upon it or within it. The structures are preferably formed by printing pyramids with an optically variable color-shifting ink using an Intaglio-like printing process. Alternatively the structure can be formed by embossing a layer of ink with positive pyramids so as to yield an array of positive embossed pyramids. Each of the structures form a pyramidal-like having at least three slanted faces and wherein one or more than one color is seen when viewing the pyramids vary as substrate is rotated at least 30 degrees about an axis orthogonal to the substrate. In order to see a color shift the device is rotated around the surface normal of the substrate, while keeping the angle of incidence to the light source the same, and keeping the viewing angle the same. Various forms of pyramids may be used, however pyramids with planar faces are most suitable.

26 Claims, 21 Drawing Sheets
(18 of 21 Drawing Sheet(s) Filed in Color)

Model 2 Case 5 Off Axis View

Looking down on three sided pyramid array (Config 3)

STRUCTURED SURFACES THAT EXHIBIT COLOR BY ROTATION

CROSS-REFERENCE TO RELATED APPLICATIONS

This application claims priority of U.S. Provisional Patent Application No. 60/916,355, filed May 7, 2007, entitled "Security Device Having Color Flip In Rotation"; U.S. Provisional Patent Application No. 61/001,240, filed Oct. 31, 2007, entitled "Structured Surfaces That Exhibit Color By Rotation"; and U.S. Provisional Patent Application No. 61/062,157 filed Jan. 24, 2008, entitled "Printing Color By Rotation Structure", which are all incorporated herein by reference for all purposes.

FIELD OF THE INVENTION

This invention relates generally to an array of structures formed upon a substrate wherein the color perceived when viewing the structures varies as the substrate is rotated or as the viewer rotates about the substrate.

BACKGROUND OF THE INVENTION

Optically variable color-shifting coatings are well known, in the form of color shifting ink, color shifting paint and multi-layer coatings deposited upon a substrate with the optical coating providing an observable color shift as the angle of incident light or viewing angle changes.

Color shifting pigments and colorants have been used in numerous applications, ranging from automobile paints to anti-counterfeiting inks for security documents and currency. Such pigments and colorants exhibit the property of changing color upon variation of the angle of incident light, or as the viewing angle of the observer is shifted. Generally, in order to see a shift in color an observer shifts the angle of the substrate relative to the light source to create a color shifting effect.

It is an object of this invention to utilize known color shifting coatings in a novel and inventive manner so as to produce an object which exhibits varying color by rotation.

SUMMARY OF THE INVENTION

In accordance with an aspect of this invention, an optically variable device comprises a substrate having an array of structures formed thereon and supported thereby, printed with an optically variable ink, wherein each of the structures form a pyramidal structure and wherein each pyramidal structure has at least three slanted faces and wherein one or more than one color is seen when viewing the pyramids vary as substrate is rotated at least 30 degrees about an axis orthogonal to the substrate. The structure may be formed by printing with an optically variable ink or by embossing a layer of optically variable ink.

In accordance with a preferred embodiment of the invention the faces of the structures are substantially planar.

In accordance with a broad aspect of this invention an array of structures are provided printed upon a substrate where the structures have at least three upstanding walls, wherein each wall contacts and terminates at a location where it contacts an adjacent upstanding wall, and wherein the walls slant inward from a base formed of or on the substrate, wherein the walls are coated with a color shifting coating that exhibits a color shift with a change of viewing angle.

In accordance with the figures an array of pyramidal structures is provided upon a substrate wherein the structures are coated with a same optically variable color shifting special effect coating. The coating can be a color shifting ink, paint, or a multi-layer color shifting coating. Although standard pyramidal structures are shown in the following examples, frusto-pyramids or stepped pyramids or other pyramidal-like structures can be utilized to achieve novel color-shifting by rotation. In accordance with a preferred embodiment of this invention pyramidal structures are actually not coated with ink but are formed from ink through an Intaglio process described hereafter. This preferred aspect of this invention is believed to be a less expensive way of making color shifting pyramidal structures wherein these color shifting structures are printed with a viscous ink containing color shifting particles or flakes.

A surprising aspect of an embodiment of this invention is that when the same uniform thickness coating is applied to all faces of a uniform symmetric pyramidal structure, different color is seen when viewing facets or faces of the pyramid "head on" versus viewing side facets. For example the front face exhibits a different color than the side facets of the pyramid. As the pyramid is rotated about an axis orthogonal to the substrate, for example as little as 30 degrees, the colors of the front and side facets change, and upon further rotation, the side facets appear to take on the color of the front facets and vice versa so that different colors are seen. This effect is particularly pleasing when an array of such structures is provided as the effect is reproduced by each pyramid and the eye tends to integrate the effect as will be shown in subsequent figures.

Furthermore, when color shifting pyramids are formed by printing pyramids with ink through an Intaglio-like process and the ink contains a uniform flake formulation, similar color shifting effects are seen to the examples described hereafter where a uniformly coated array of pyramids is provided.

In accordance with an alternative aspect of the invention a UV curable optically variable printing ink or an Intaglio optically variable printing ink that has been coated to a thickness of 50-100 microns is embossed with a embossing tool that has on it surface an array of positive pyramidal structures provides spaces between the positive embossing pyramids which become the positive printed pyramids in the curable optically variable ink after the embossing.

In order to more clearly understand this invention, aspects are described in FIGS. 1 through 17 which are not claimed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary embodiments of the invention will now be described in conjunction with the figures in which.

DETAILED DESCRIPTION

Figure 1:
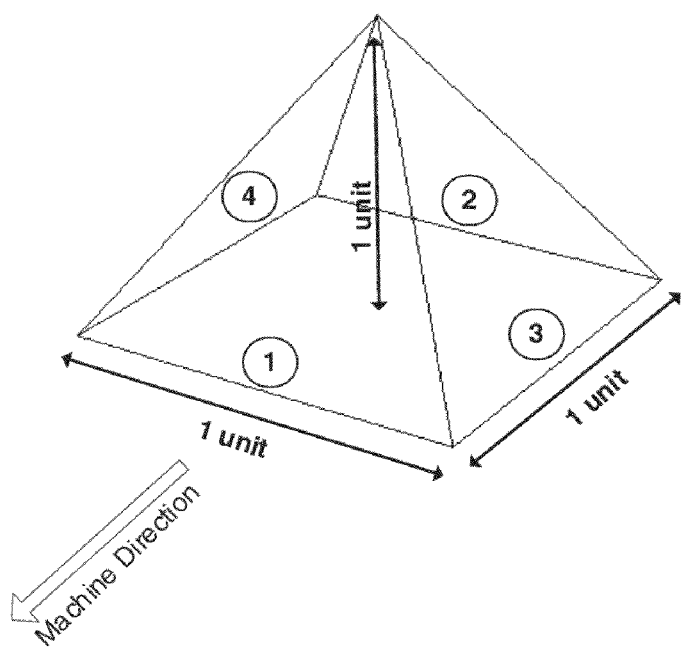
FIG. 1 is an isometric drawing of a pyramidal cell in accordance with an aspect of this invention.

Referring now to FIG. 1, a pyramidal unit cell having 4 upstanding slanted walls numbered 1 through 4 is shown upon a base supporting the unit cell. The unit cell may be hollow inside or may be a solid. This unit cell is the basic structure that will be described in accordance with this invention. However variants of this unit cell will also be described and encompass embodiments of this invention.

Modeling of Structured Surfaces that Exhibit Color By Rotation

A visual model of structured surfaces with an optically variable color shifting type coating design was modeled and simulated using a 3-D rendering software package with a custom lighting model using an optical coating design software program. The lighting model used assumes completely diffuse lighting conditions, so only the angle between the facet normals and camera location need to be considered to approximate the color observed by the viewer of the model.

The aforementioned modeling was used to investigate critical design parameters of a structured surface that exhibits a color by rotation effect.

The modeling was essentially focused on a micro replicated surface consisting of a simple pyramidal structure. Notwithstanding, more complicated geometries are possible and will also exhibit color by rotation effects. The modeling is used to identify key design parameters important from substrate and coating design perspective.

Coating Design

The coating design used to model the performance of the structure was an optical stack consisting of a reflector, dielectric, and absorber to simulate the performance of an optically variable color shifting coating on the structure.

The optical designs considered were the following:
(1) Aluminum (100 nm)/Magnesium Fluoride (Variable Thickness)/Chromium (6 nm)
(2) Aluminum (100 nm)/Zinc Sulfide (Variable Thickness)/Chromium (6 nm)

Unit Cell

Modeling was performed using the simple four sided pyramidal structure with a square base measuring 1 unit on each side as is shown in FIG. 1. The apex of the pyramidal structure was centered over the base, with the height above the base as a design variable.

The basic unit cell shown in FIG. 1 has faces numbered (1) and (2) on the opposite sides of the pyramid structure. The faces (1) and (2) are defined to be in the machine direction. Accordingly, the machine direction refers to the direction of web travel. In most of the models presented, these faces will be assumed to generally have a greater coating thickness than faces (3) and (4) which are in the non-machine direction.

The relative coating thickness on each pyramid face is a complicated function of source and coating geometry. However, the optimal relative coating thicknesses will be considered in order to achieve the desired overall visual appearance in a product form.

Model #1 presents a model that exhibits color by rotation effect wherein the pyramidal facets or faces have equal thicknesses of dielectric on each face. Hence the color of the coating is the same on each face if each face were to be viewed at the same angle. A color by rotation effect is observed on a pyramidal structure when there is no difference in dielectric coating thickness on each face of the structure.

In this instance, an $MgF_2$ layer was used for the dielectric spacer layer with a coating thickness of 360 nm which corresponds to a Green/Blue optically variable pigment (OVP) coating design.

The OVP face color is observed when viewing any face in a normal viewing position while the angle color is visible when viewing from non-normal position. In this case all face axes and angle axes are equivalent with each face having the same dielectric thickness. Model #1 illustrates that a difference in the dielectric thickness among faces of the pyramid structure is not required to achieve a color by rotation effect. Stated more simply, all faces may be coated with a same thickness of coating to achieve the desired effect of color by rotation.

Table 1 below shows in a wire grid frame model a "Face View" and an "Angle View" of the pyramidal cell used. Below in the same table is a view of the "Unit Cell Model" with color shifting coating, wherein face view illustrates the face color, green, and the angle view illustrates a light blue seen from the same coated cell. The last row of cells in Table 1 shows a "Surface View of Array of Unit Cell Pyramids". The array of pyramids that corresponds to the face view shows green pyramids whereas the array shown in angle view shows light blue pyramids.

TABLE 1

| | Face View | Angle View |
|---|---|---|
| Wire Frame Model | | |
| Unit Cell Model | | |
| Surface View of Array of Unit Cell Pyramids | | |

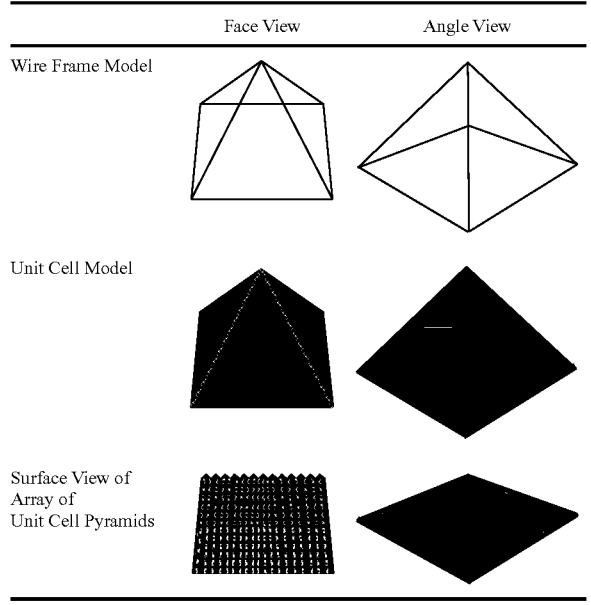

Figure 2:
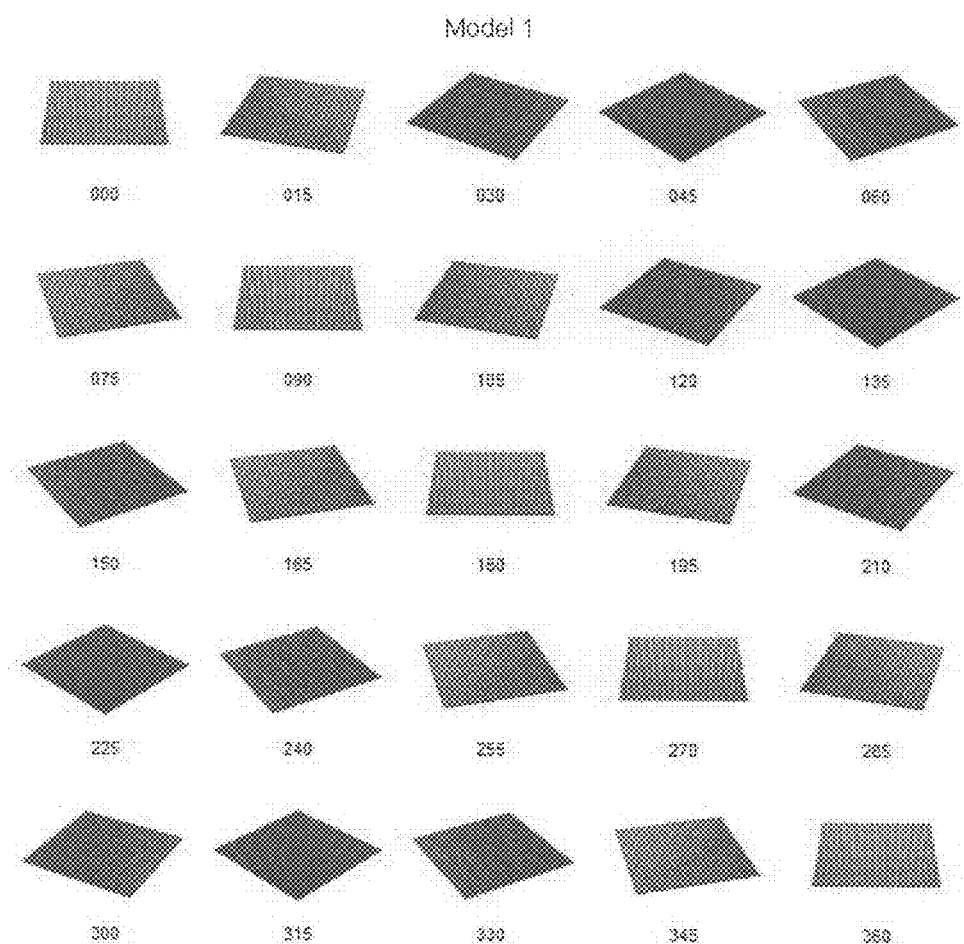
FIG. 2 is a drawing of a Model #1 showing 25 views at different viewing angles each varying from the preceding one by 15 degrees and wherein color travel is seen as the model is rotated.
Figure 3:
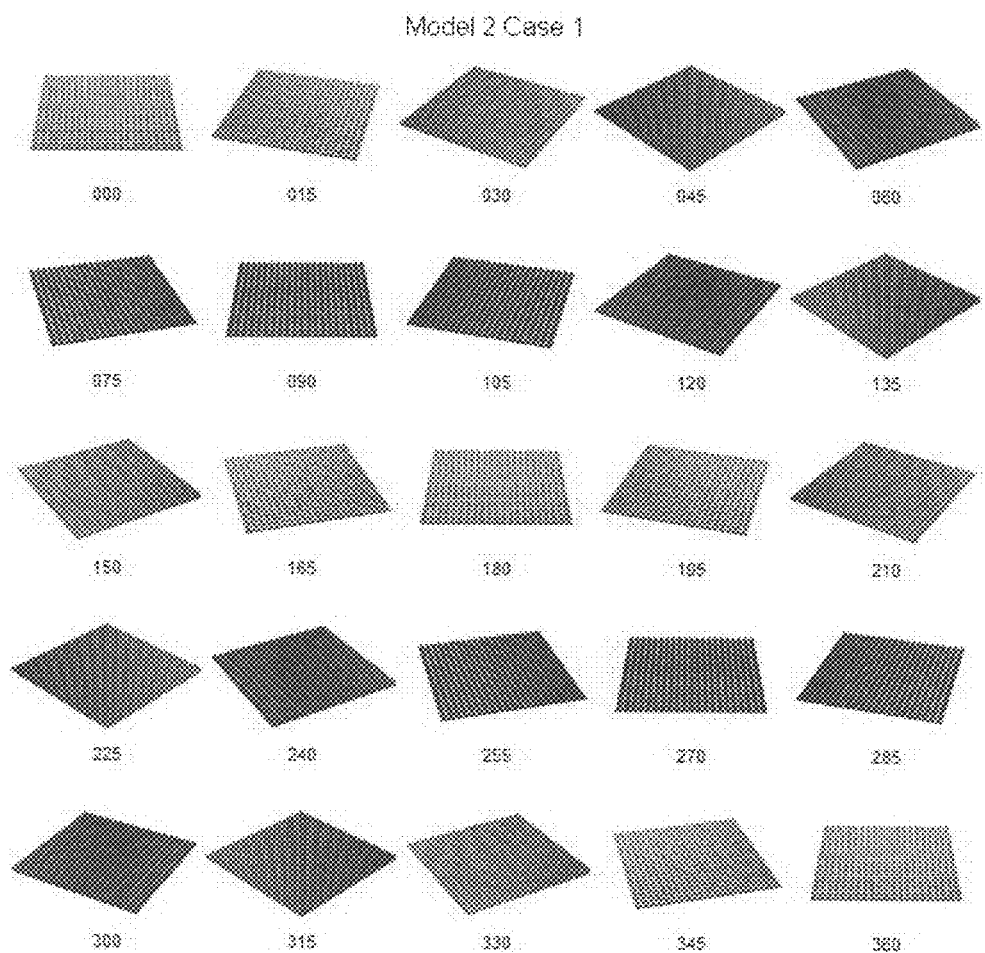
FIG. 3 is a drawing of a Model #2 showing case 1 showing 25 views at different viewing angles each varying from the or preceding one by 15 degrees and wherein color travel is seen as the model is rotated.
Figure 4:
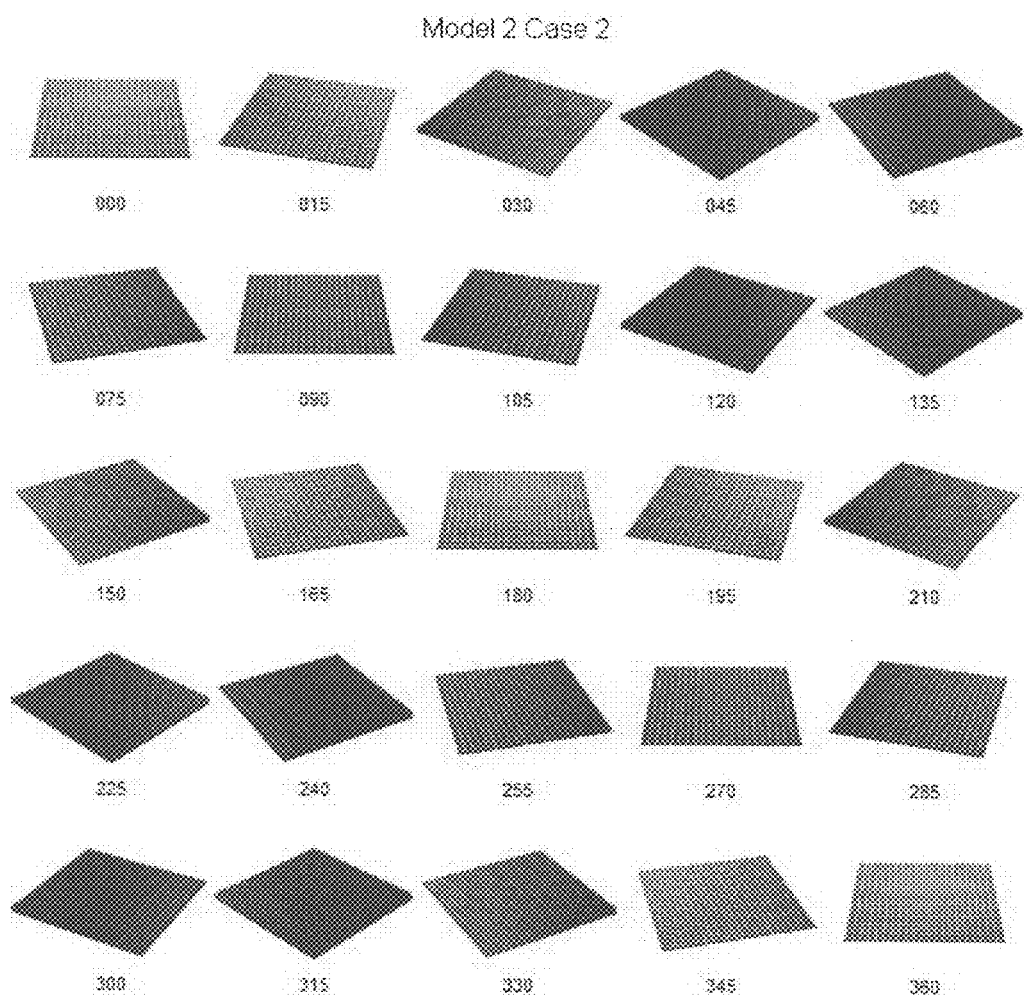
FIG. 4 is a drawing of a Model #2 showing case 2 showing 25 views at different viewing angles each varying from the or preceding one by 15 degrees and wherein color travel is seen as the model is rotated.
Figure 5:
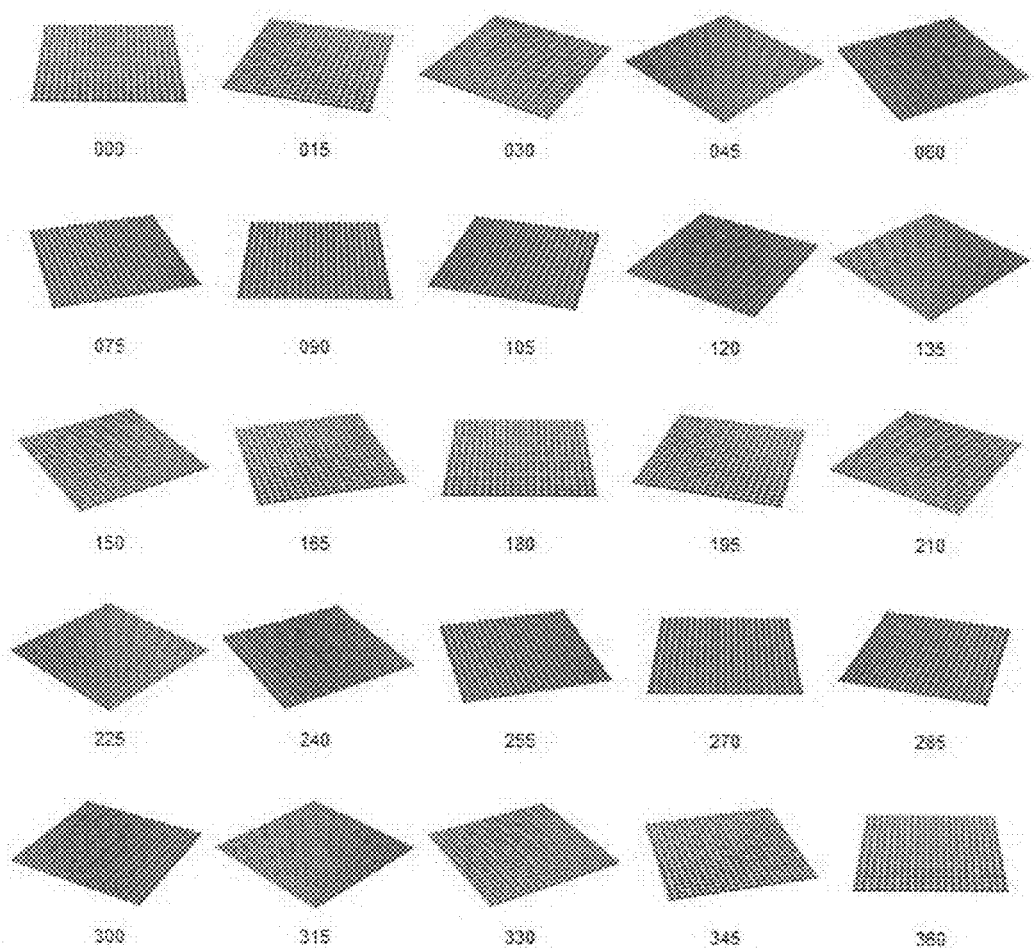
FIG. 5 is a drawing of a Model #2 showing case 3 showing 25 views at different viewing angles each varying from the or preceding one by 15 degrees and wherein color travel is seen as the model is rotated.

FIG. 2 shows views at different angles of color travel for model #1 from 0 degrees, i.e. face view, to rotation through various angles in increments of 15 degrees and up to 360 degrees of rotation from the original face view at 0 degrees.

In contrast, model #2 represents color by rotation with a coating of unequal thickness on adjacent faces. In this exemplary embodiment a different dielectric thicknesses is provided on different adjacent facets. Thus, facets or faces (1) and (2) are coated with a same thickness of coating and faces (3) and (4) are coated with a different same thickness of coating material. Although Model #2 is a simulation representing an actual coating, such a coating with these design parameters can be coated with the proper source and masking geometry in a vacuum roll coater. In this embodiment, machine direction faces (1,2) have equal dielectric thicknesses while non-machine direction faces (3,4) have less dielectric due to oblique coating angles in machine.

In this embodiment, because adjacent pyramid faces have significantly different dielectric thicknesses, maximum color travel is observed every 90 degrees of rotation instead of every 45 degrees of rotation as was the case with model #1 where all dielectric thicknesses are equal. Two different instances, exemplified by case 1, and case 2 of Model #2, are provided, wherein different coatings are applied in each. In model #2 case 1, the ratio provided refers to the relative amount of coating deposited on each face compared to a nominal MgF2 design thickness. By way of example, for Model #2 Case 1, the base design is Al/MgF2 (360 nm)/Cr (6 nm). Thus in this instance where the face 1 and face 2 ratio is 1, the following coating design is used: Al/MgF2 (360 nm)/Cr (6 nm). For face 3 and 4 where the ratio is 0.8 the following coating design is used: Al/MgF2 (288 nm)/Cr (6 nm). The ratio relates to the differing thickness in the MgF2 dielectric spacer layer.

TABLE 2A

Model 2 Case 1 - Green/Blue (0.8)

| | |
|---|---|
| Viewing Angle | 45 Degrees |
| MgF2 Thickness | 360 nm |
| Face (1) and (2) Ratio | 1.0 |
| Face (3) and (4) Ratio | 0.8 |

The first case of Model #2 used a ratio of 0.8 for the non machine direction faces. Case 2 shows a similar configuration using a 0.9 multiplier for the non-machine direction faces.

TABLE 2B

Model 2 Case 2 - Green/Blue (0.9)

| | |
|---|---|
| Viewing Angle | 45 Degrees |
| MgF2 Thickness | 360 nm |
| Face (1) and (2) Ratio | 1.0 |
| Face (3) and (4) Ratio | 0.9 |

Decreasing the non-machine direction face ratio to 0.7 results in a shift to a reddish magenta color rather than blue at the 90 and 270 degree angles.

TABLE 2C

Model 2 Case 3 - Green/Blue (0.7)

| | |
|---|---|
| Viewing Angle | 45 Degrees |
| MgF2 Thickness | 360 nm |
| Face (1) and (2) Ratio | 1.0 |
| Face (3) and (4) Ratio | 0.7 |

Model #2 Observations

Modifying the dielectric thicknesses of the off-axis faces (3) and (4) has a strong impact on the observed color when the substrate is rotated into a position where these faces dominate the field of view. (rotation angles of 90° and 270°) Changing the dielectric thickness of the off-axis faces (3) and (4) has a smaller impact on color when viewing opposing faces (1) and (2) because these faces are oblique, present a smaller cross section, and lose chromaticity due to higher angle viewing of the optical coating design.

The off-axis color on faces (3) and (4) varies strongly as the thickness ratio is changed because the dielectric thickness is changing.

Another import consequence of both on-axis and off-axis faces being observable in the same visual field is that when viewing the on-axis face, the off-axis face does make a significant contribution to the observed color. There are some combinations of dielectric thicknesses and off-axis face ratios that have a more appealing appearance because one or both of the following conditions may occur:

(1) When viewing on-axis, the observed shift color from the off-axis facets coordinates well with the face color of the on-axis facets wherein the colors have a similar hue angle;

(2) When viewing off-axis, the observed shift color from the on-axis facets coordinates well with the face color of the off-axis facets.

Figure 6A:
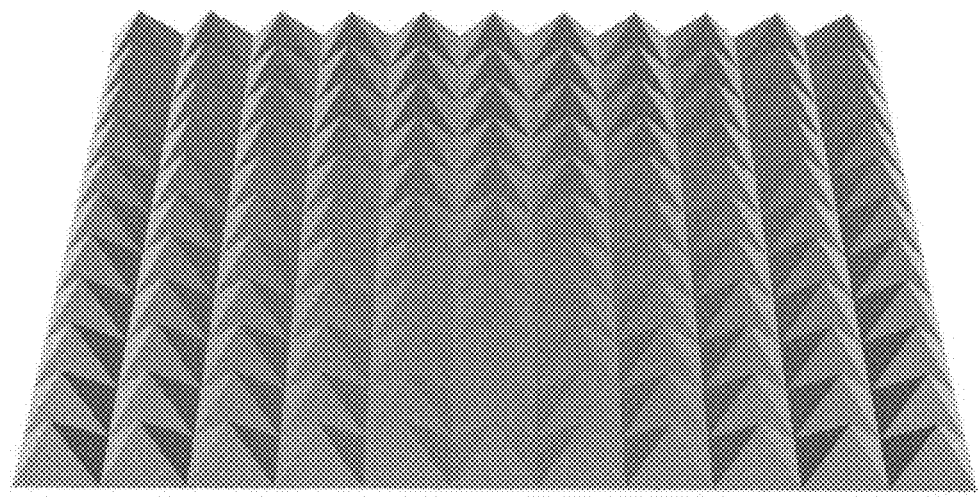
FIG. 6a is a drawing showing an on axis view of Model #2 case 4.
Figure 6B:
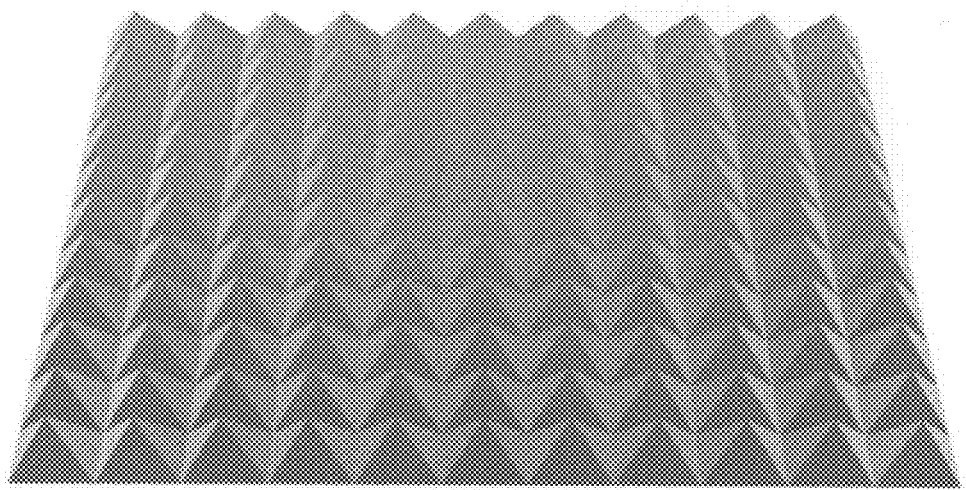
FIG. 6b is a drawing showing an off axis view of Model #2 case 4.
Figure 7:
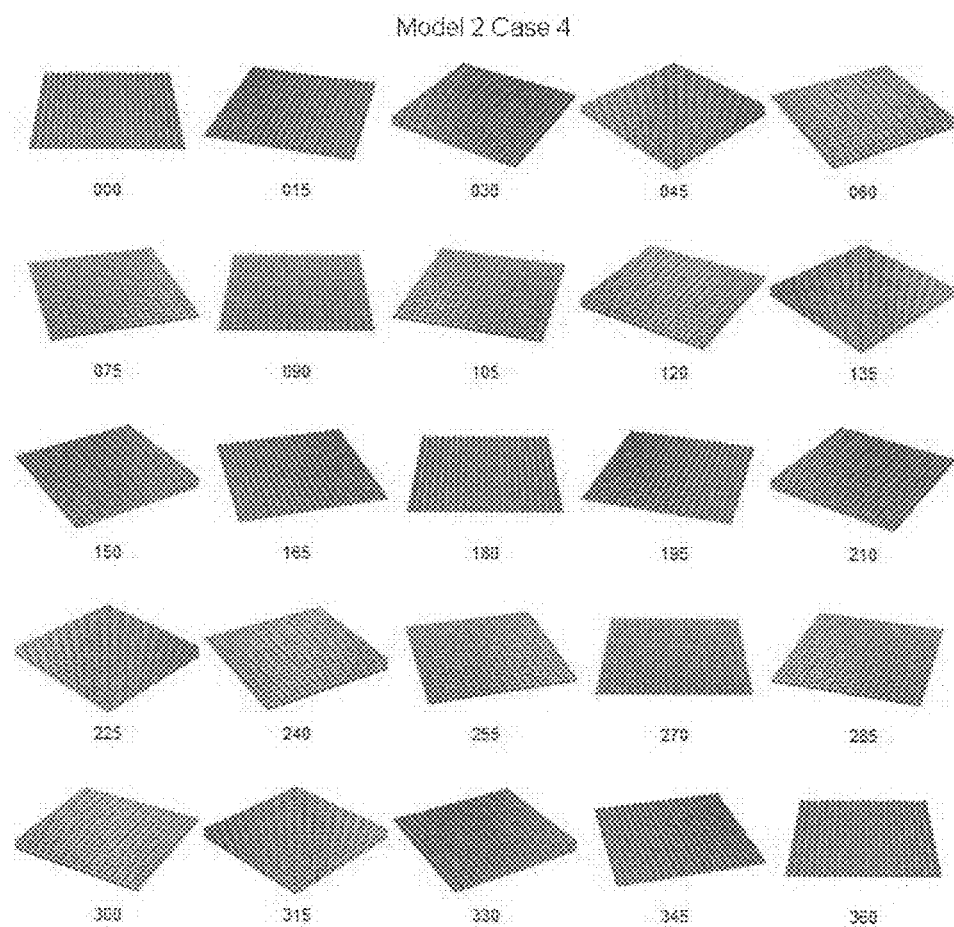
FIG. 7 is a drawing of a Model #2 showing case 4 showing 25 views at different viewing angles each varying from the or preceding one by 15 degrees and wherein color travel is seen as the model is rotated.

The following examples illustrate the above conditions:

In Model 2 Case 4, the same unit cell is used, with a base MgF2 thickness of 480 nm which corresponds to a Magenta to Green OVP design. As in Case 1, a 0.80 ratio is used for the coating thickness on the off-axis faces. In this particular case, both conditions 1 and 2 are met. This is shown in FIGS. 6a and 6b.

TABLE 2D

| Model 2 Case 4 - Magneta to Green (0.8) | |
| --- | --- |
| Viewing Angle | 45 Degrees |
| MgF2 Thickness | 480 nm |
| Face (1) and (2) Ratio | 1.0 |
| Face (3) and (4) Ratio | 0.8 |

In this example, the on-axis view shows the Magenta design coordinating with the blue shift color from the off-axis faces. In the off-axis view, the green face color coordinates well with the green shift color from the magenta face.

Overall, Model 2 Case 4 shows a very strong color by rotation effect because viewing both on-axis and off-axis viewing result in coordinating colors which reinforce each other in both viewing axes.

The key parameters required to meet these requirements are dielectric index of refraction, dielectric thickness, on-axis to off-axis dielectric thickness, and unit cell design. Dielectrics with a low index of refraction, i.e. below about 1.6 such as $MgF_2$ are preferred because they exhibit a stronger color shift which is required to achieve coordinating colors with similar hue angles in the on-axis and off-axis orientations. High index materials may also be used to achieve color by rotation with functional but less dramatic results.

Figure 8A:
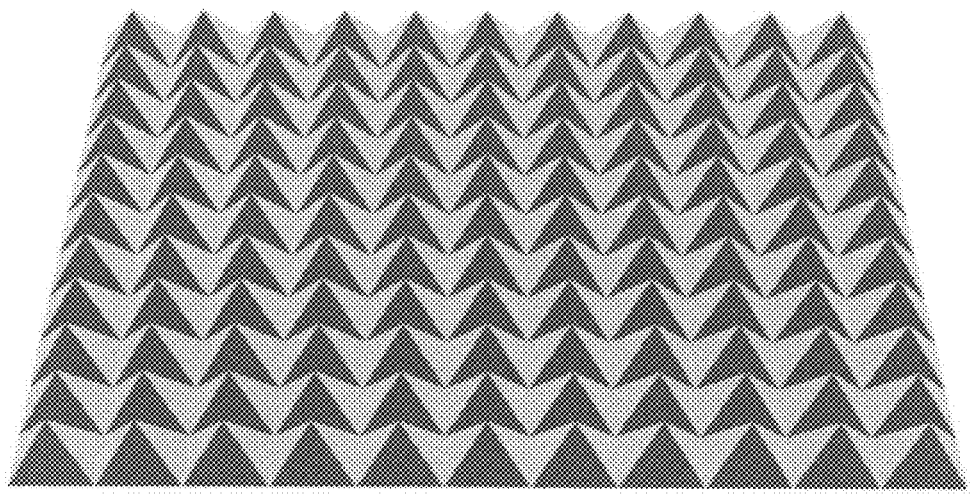
FIG. 8a is a drawing showing an on axis view of Model #2 case 5.
Figure 8B:
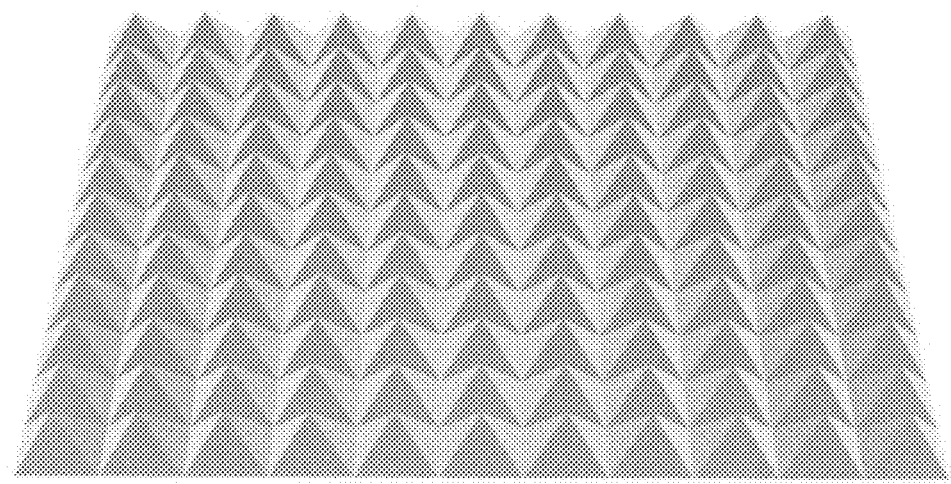
FIG. 8b is a drawing showing an off axis view of Model #2 case 5.
Figure 9:
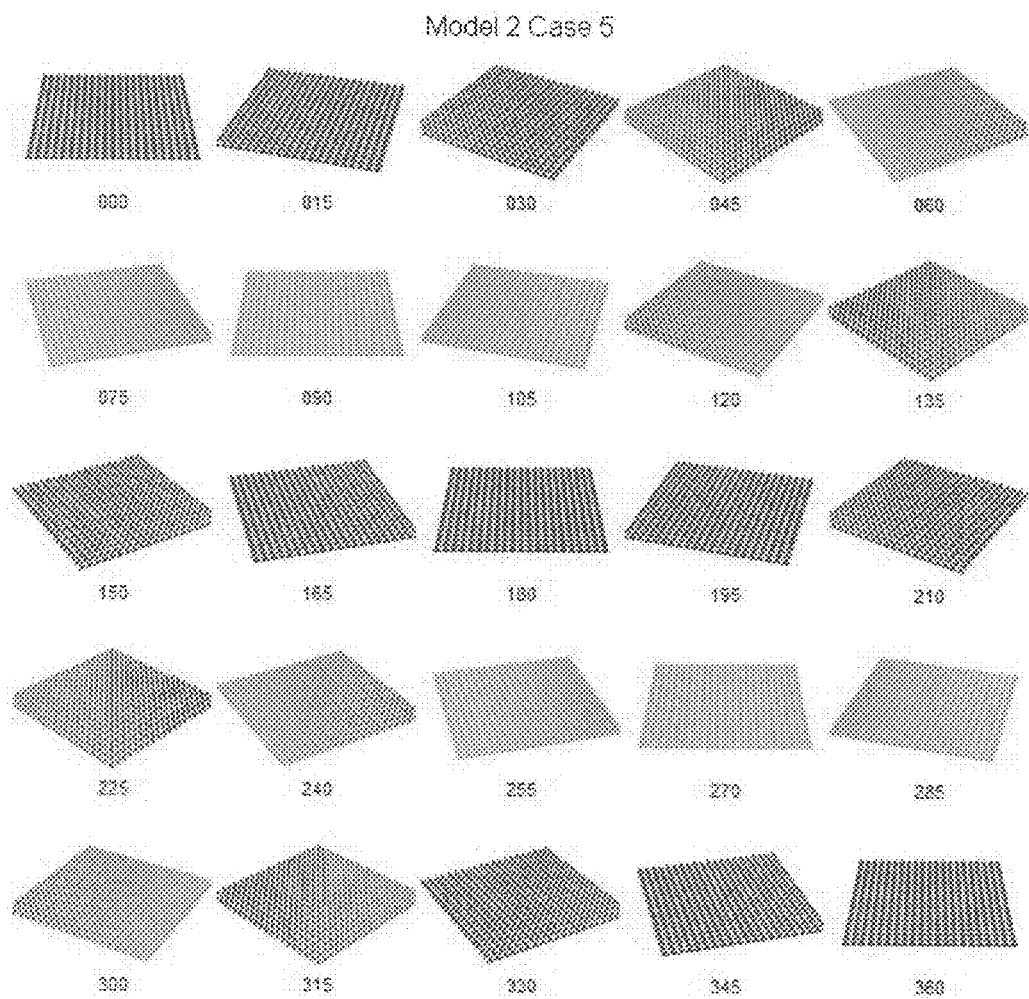
FIG. 9 is a drawing of a Model #2 showing case 5 showing 25 views at different viewing angles each varying from the or preceding one by 15 degrees and wherein color travel is seen as the model is rotated.
Figure 10:
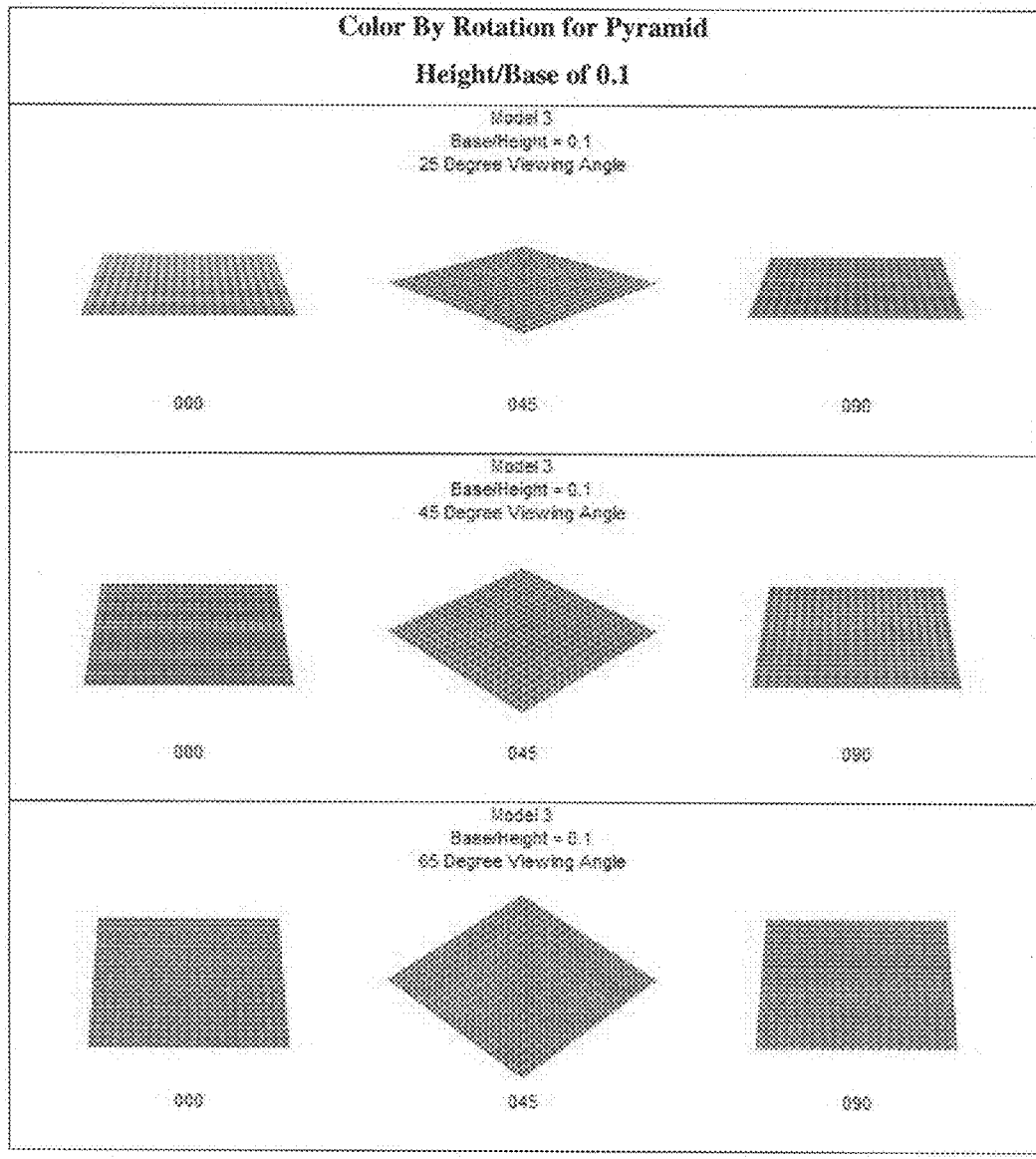
FIG. 10 is a drawing illustrating model #3 with a height/base ratio of 0.1, rotated in three different positions and at three different viewing angles.
Figure 11:
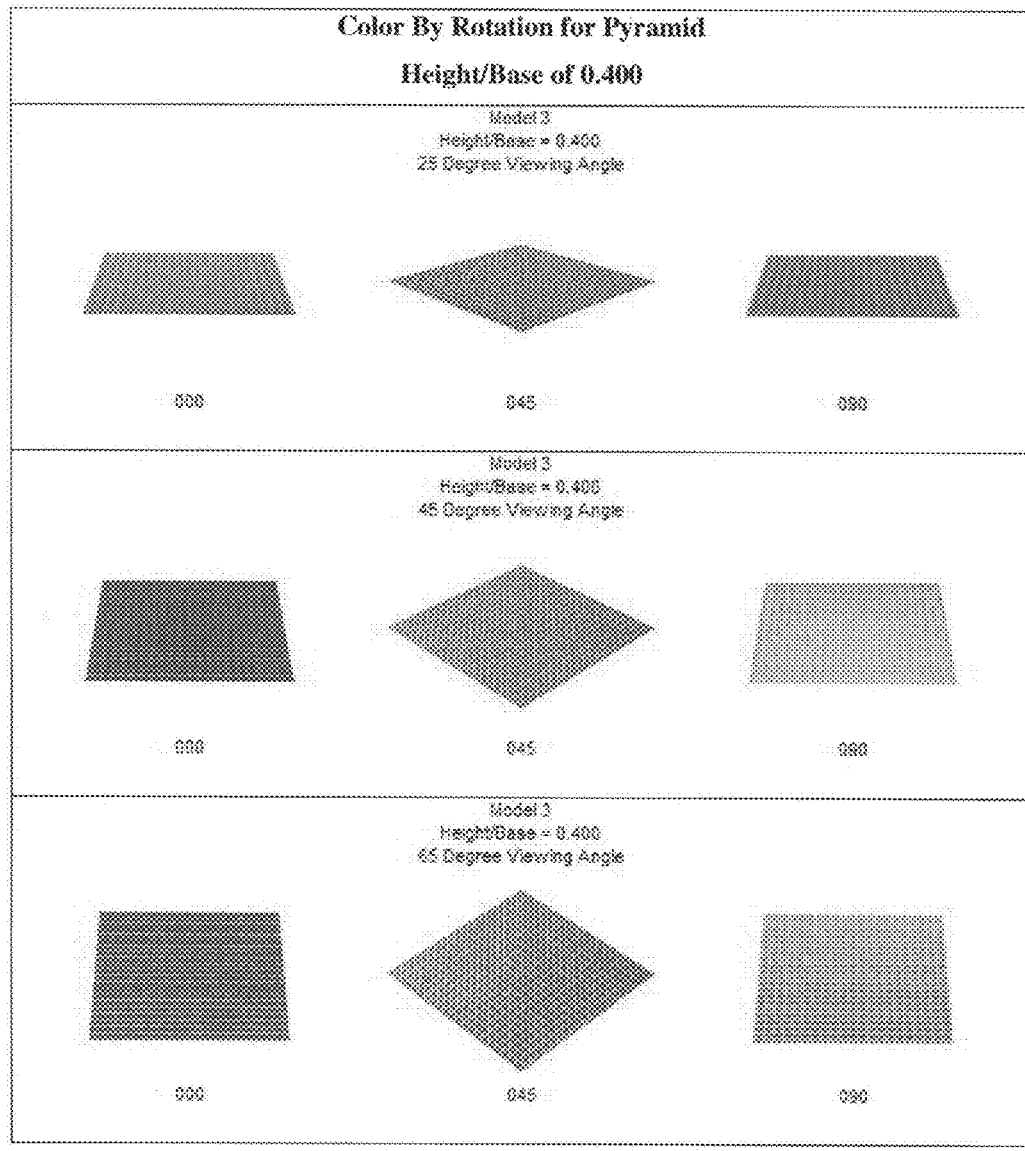
FIG. 11 is a drawing illustrating model #3 with a height/base ratio of 0.4, rotated in three different positions and at three different viewing angles.
Figure 12:
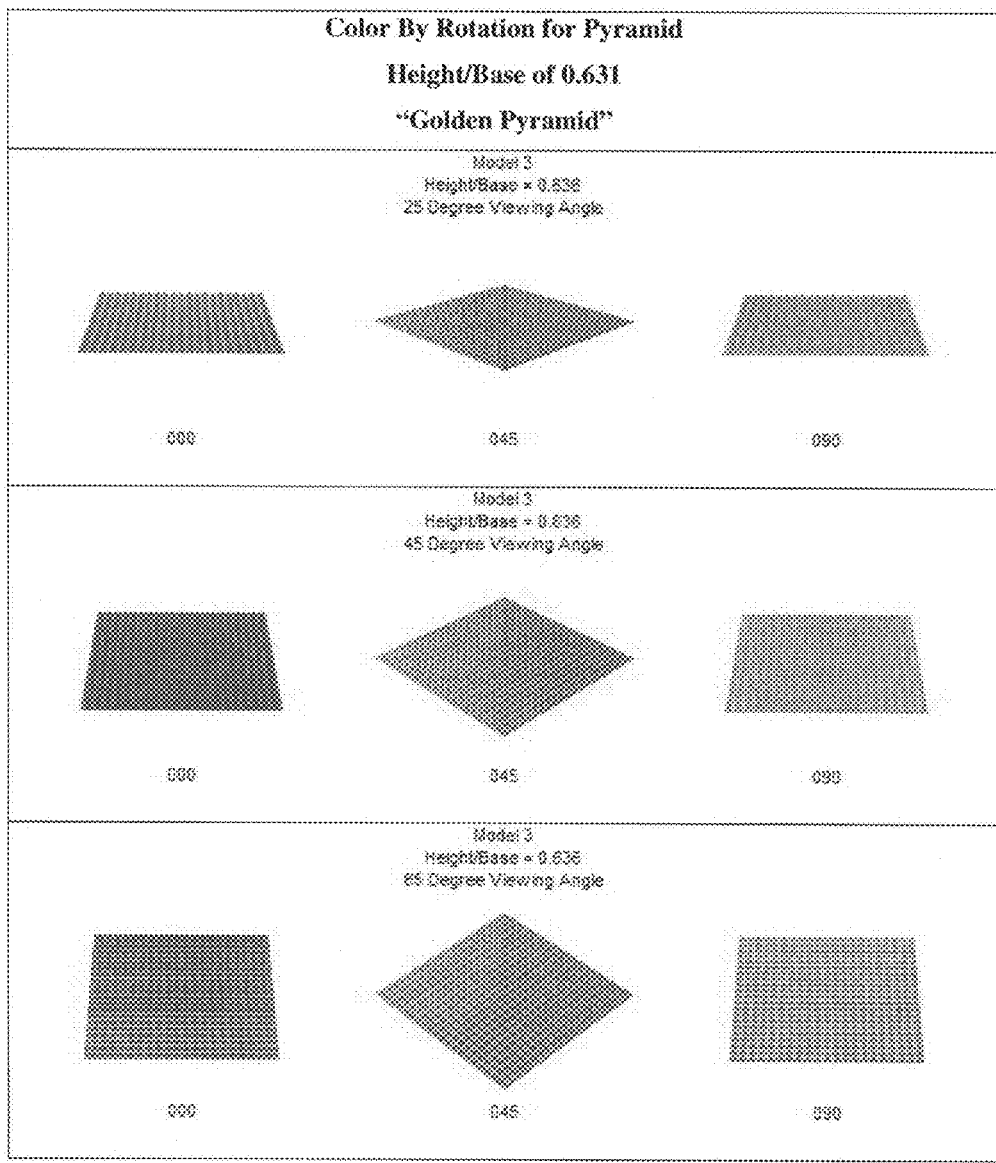
FIG. 12 is a drawing illustrating model #3 with a height/base ratio of 0.631, rotated in three different positions and at three different viewing angles.
Figure 13:
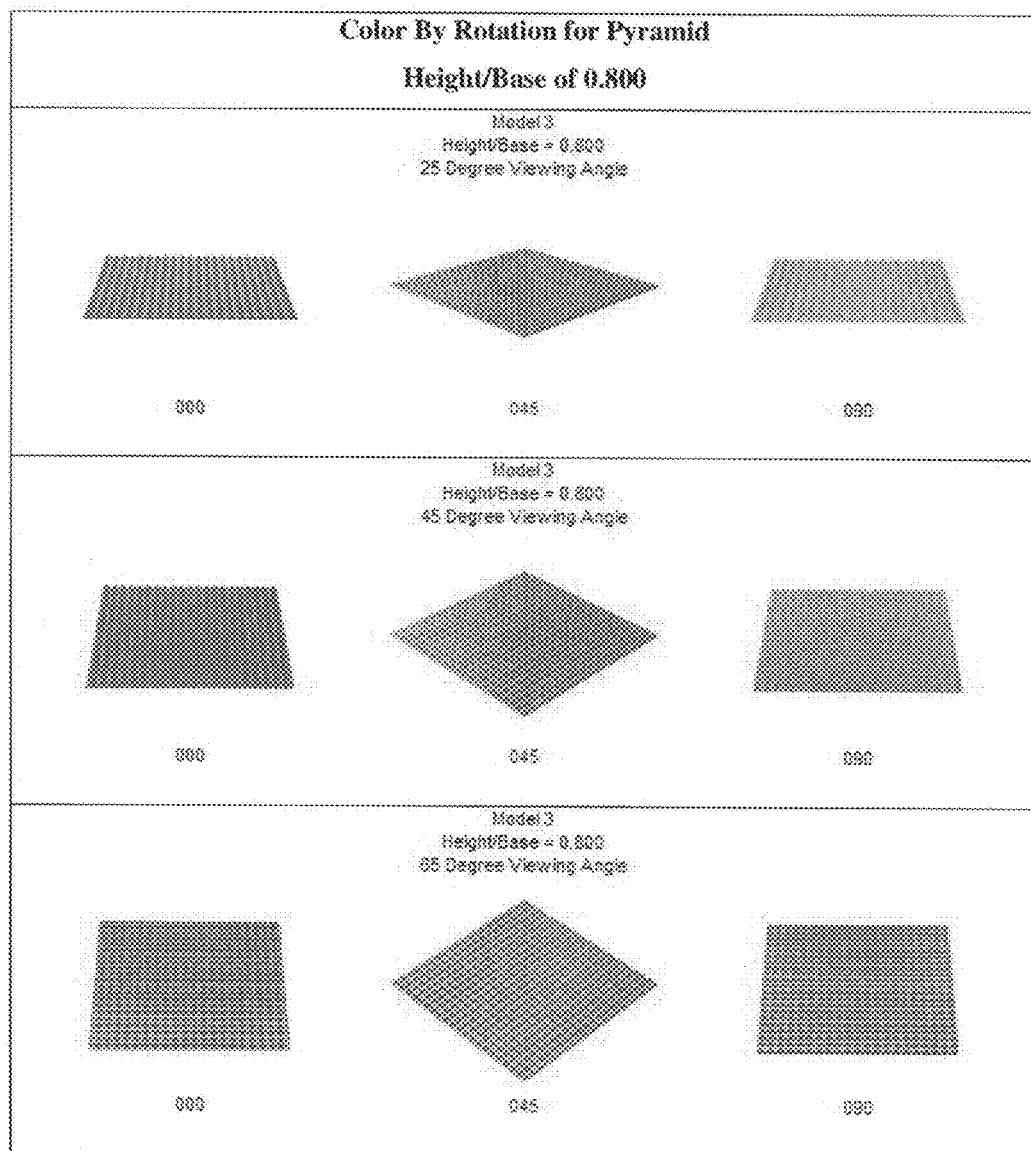
FIG. 13 is a drawing illustrating model #3 with a height/base ratio of 0.8, rotated in three different positions and at three different viewing angles.
Figure 14:
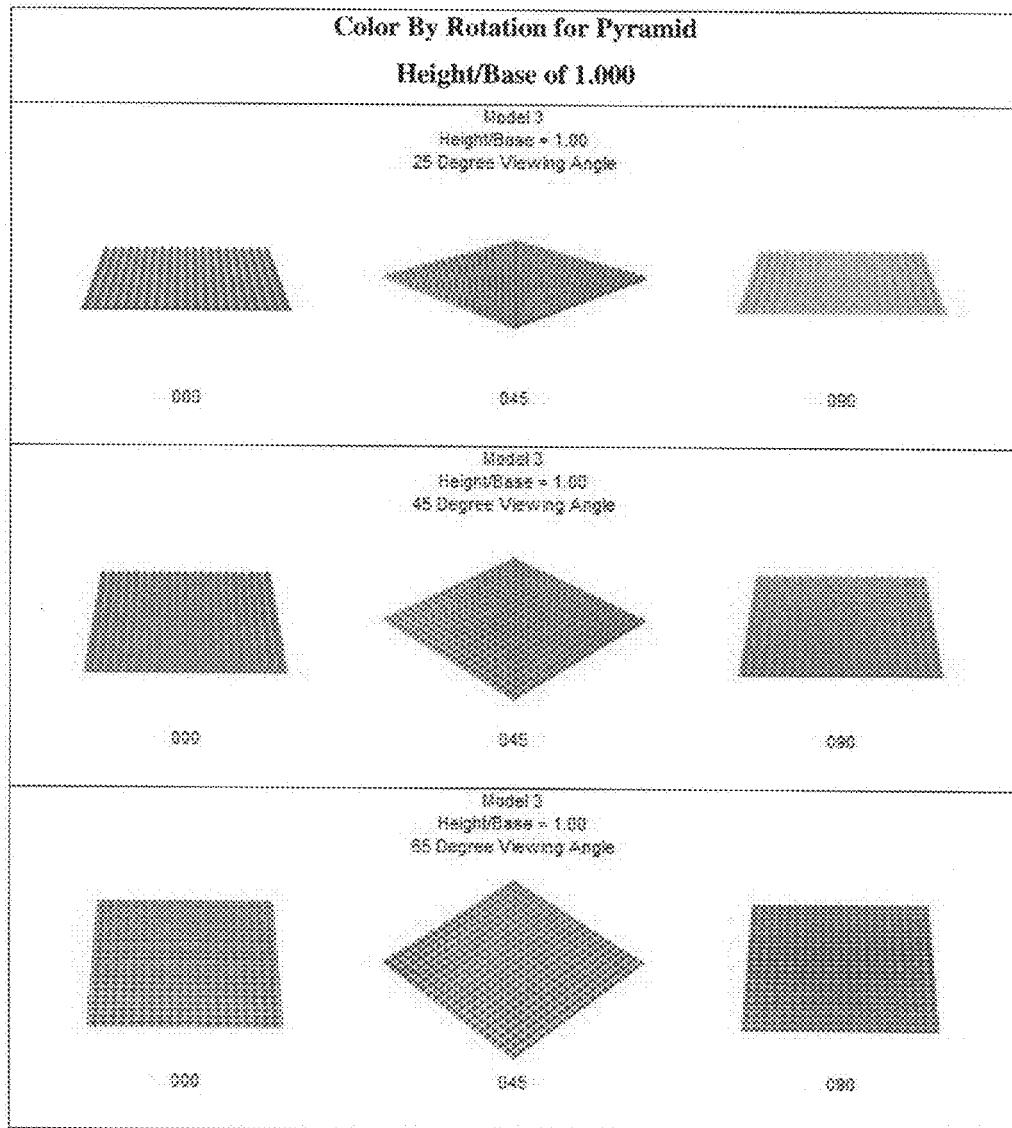
FIG. 14 is a drawing illustrating model #3 with a height/base ratio of 1.0, rotated in three different positions and at three different viewing angles.

Model 2 Case 5 shown in FIGS. 8a, 8b and FIG. 9 shows an example of another case where coordinating colors are not realized, that is where colors of similar hue are not presented to the viewer at the on-axis orientation and the observed color is not quite as dramatic. In this case, coordinating colors are still present in the off-axis orientation resulting the in the reinforced gold color on the off-axis view.

TABLE 2E

| Model 2 Case 5 - Blue to Red (0.8) | |
| --- | --- |
| Viewing Angle | 45 Degrees |
| MgF2 Thickness | 270 nm |
| Face (1) and (2) Ratio | 1.0 |
| Face (3) and (4) Ratio | 0.8 |

Model #3: Optimization of Pyramid Height and Viewing Angles

This model illustrated by FIGS. 10, 11, 12, 13, and 14 investigates the potential impact of the height of the pyramid and viewing angle on product appearance. One of the parameters that must be determined is the target height of the surface structure. In this model, four pyramid heights and three viewing angles were simulated to investigate the impact on overall product appearance.

TABLE 3

| Model 3 - Magneta to Green (0.8) | |
| --- | --- |
| Viewing Angle | Variable |
| MgF2 Thickness | 480 nm |
| Face (1) and (2) Ratio | 1.0 |
| Face (3) and (4) Ratio | 0.8 |

Viewing Angle Conclusions

In a preferred embodiment of this invention, the most ideal unit cell height to base ratio has proven to be the "Golden Pyramid" ratio with a height to base ratio of 0.636. Of the ratios used in our simulations, this ratio showed the least amount of apparent color variation over a typical range of substrate viewing angles which ranged from 25 degrees to 65 degrees above the substrate plane. The 0.8 height to base ratio was also found to be acceptable.

Lower height to base ratios such as the case with 0.4 results in large hue changes as a function of viewing angle from the substrate plane. In this embodiment the extreme yellowing of the off-axis view as the viewing angle is increased. Larger height to base ratios such as 1.0 also started to show significant hue variation as a function of viewing angle from the substrate plane Through simulations performed, we have found that the optimal height to base ratio appears to be in the range of 0.6 to 0.8. In this case, the assumption was that the off-axis faces were always receiving 80% of the coating that the on-axis faces were receiving. This is probably not feasible as the height to base ratio becomes small due to the coating geometry constraints. However, it is clear that there is an optimal height to base ratio of the unit cell that produces the least amount of visual variation as the viewing angle from the substrate plane is varied.

As a result of the modeling, we conclude that:
1) To achieve a color by rotation effect on a pyramidal structure, a difference in MgF2 thickness on faces is not required. Color by rotation will be observable even with equal coating thicknesses. The maximum color travel will occur on the 45 degree axis in this case.
2) For unequal facet MgF2 thicknesses a stronger color shift is observed with maximum color travel on the 90 degree axis of rotation.
3) A stronger color by rotation effect will be observed in the situation where facet colors reinforce each other by having similar hue angles.
4) Model 3 provides information related to the optimal height to base ratio to provide optimal color travel when viewing the substrate at different angles of inclination.

The pyramidal array can be formed by embossing a flexible or rigid deformable substrate from an appropriate master. The master can be made by diamond cutting or other suitable micromachining techniques such as electron beam lithography, ion milling, or other microreplication techniques. We believe that techniques can be employed to make masters that could be used in an embossing process. In one embodiment the use of an anilox roller having indented pyramids and other shapes used in the printing trade as a template for making a positive nickel master by means of electro less nickel with a release layer, followed by growing a nickel daughter image from the nickel master which in turn is used to emboss a UV curable lacquer on a web to make positive pyramidal shapes. Information regarding anilox rollers can currently be found on the Internet at http://www.harperimage.com/anilox-specify.asp and http://www.appliedlaser.co.uk/anilox.htm.

In all of the embodiments described heretofore, it is preferred the dimensions of the pyramids are below eye resolution of about 100 microns. Thus the height of the pyramids is preferably below 100 microns. This is important from a security viewpoint because it would be non-obvious to an observer as to why one color shift is occurring.

Figure 17:
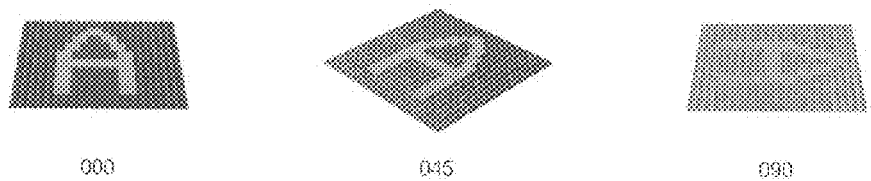
FIG. 17 is a drawing illustrating a model having the letter "A" defined within the web by having an absence of pyramids in this region.

In addition to providing visually appealing security coatings, embodiments of this invention use forms of linear coding by varying the heights of pyramids in a linear sequence to create an overt or covert readable "bar code" effect depending on the degree of modulation used. Overt images, symbols, words could be written into the pattern by geometrical variations to the unit cell. Alteration of cell height, orientation, cell size, facet angles could all be used to encode information. FIG. 17 shows indicia in the form of a letter "A" provided by exposing the substrate in this region.

In an embodiment of this invention not shown in the drawings, a visible logo is formed by orienting a particular region of pyramids for forming a logo, at 45 degrees to other pyramids which serve as a contrasting background within the security device, and coating all of the pyramids with a same color shifting coating. In this manner, the pyramids forming the logo appear in a first color distinct from the color of the background pyramids. As the device is rotated the colors change, and at a particular angle, the colors of the two regions appear to switch.

Various other embodiments can be envisaged wherein indicia in the form of a logo or text can be encoded within the array of pyramids or between the pyramids. Regions of pyramids can have different geometries than others, thereby providing a visual distinction so as to define a logo or text. In a particular embodiment a security thread in which most of the area on the web has the same pyramid geometries but in certain regions some of the pyramids have different face angles. This would allow an image to appear when the device is rotated. Alternatively, some frusto-pyramids can be provided with flat tops, within a region, thereby defining a logo or indicia distinguishable from other regular shaped pyramids. Essentially what is required in all of these embodiments is a region, within a larger region of pyramids that is visually distinguishable in such a manner as to define indicia.

Heretofore, pyramids having flat planar surfaces have been described, however pyramids having one or more faces having diffractive grooves formed therein would provide additional effects to the color shifting described. For example pyramids having facial grooves extending from the base to the apex can be provided, and stepped pyramids can also be provided. The stepped pyramids can have steps at small diffractive widths or can be larger. These pyramids would provide interesting color/extinction effects as the faces move in rotation, especially with specular coatings on the faces.

Such pyramids would even provide interesting effects even with a mirror coating of, for example, aluminum. Aluminized pyramids can be provided in a selected pattern purposely dispersed within the optically variable coated pyramids so as to form a logo or indica that is distinguishable from the color shifting coated pyramids.

Figure 15:
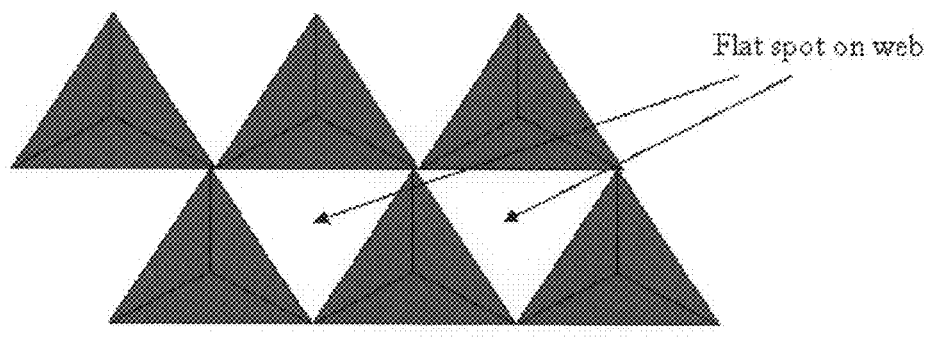
FIG. 15 is a drawing showing a plan view of an array of three sided pyramids wherein the flat web is present between adjacent pyramids.
Figure 16:
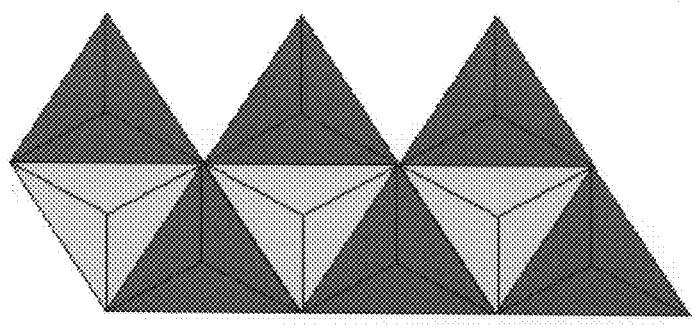
FIG. 16 is a drawing similar to that of FIG. 15 wherein pyramids are shown that are upstanding, with pyramids of a different color representing inverted pyramids.

Various packing configurations of pyramids can be provided. For example FIG. 15 shows an embodiment wherein planar spaces of the substrate are shown between upstanding pyramids, and in FIG. 16, upstanding and inverted pyramids are shown juxtaposed.

Pyramids can also be provided that are skewed relative to the machine direction shown in the figures.

A preferred embodiment of this invention relates to the printing of pyramids with color shifting ink. Intaglio printing is a well known printing method using a printing plate having recesses formed in printing image areas with respect to non-printing image areas. After the entire intaglio printing plate is filled with a highly viscous ink, the ink on the non-printing image areas is wiped off to leave the ink only in the printing image areas. Thereafter, a web or substrate such as a paper sheet is forced directly to the printing plate under heavy pressure to transfer the ink remaining in the printing image areas onto the paper. Line-engraved intaglio printing is typically used for printing security documents, such as banknotes, and uses printing cylinders having engravings therein in which intaglio printing inks have been deposited. The highly viscous paste-like intaglio inks used in such printing are substantially different in nature from inks used in other forms of printing such as gravure, offset and ink-jet printing. Optically variable prints for other security documents and currencies are often printed on sheet-fed intaglio presses. The printing process involves enormous pressures (tons/sq-in) on the paper in the ink transfer from the plate, high press speeds (200-500 ft/min), ultra viscous nature of the ink, and fast kinetics of the surface drying.

Figure 18:
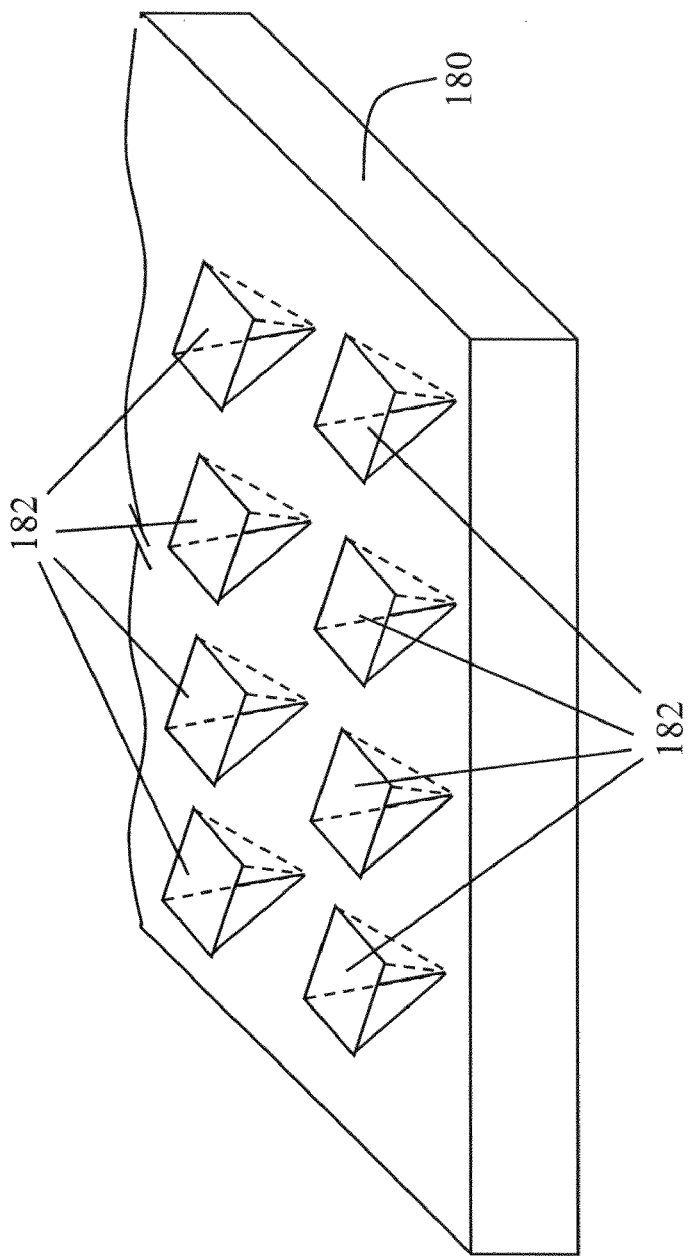
FIG. 18 is a drawing of an Intaglio printing press having pyramidal recesses for printing pyramidal structures formed of color shifting ink.

Referring now to FIG. 18, an engraved printing plate 180 is shown for printing pyramidal structures. The plate 180 is an Intaglio-type plate with an array of engraved pyramidal indentations 182 shown for use in forming an array of color shifting pyramidal structures. The ink for use in printing contains optically variable pigment and preferably color shifting pigment.

The printed array formed of color shifting ink results in an image that provides color by rotation. This is an alternative embodiment in which to obtain color by rotation to those described heretofore wherein color by rotation can be obtained by depositing a organic layer onto a PET substrate, and subsequently embossing pyramids all with the same face angles into it, followed by vacuum deposition of OVD thin film interference design onto these pyramids.

Notwithstanding, printing pyramidal structures with color shifting ink is believed to be simpler and more cost effective to accomplish and it can achieve these color by rotation effects on current Intaglio presses simply by making an Intaglio plate with an array of pyramids. The figures shown above are suitable for demonstrating the resulting pattern and color shifting effects obtained by printing pyramidal structures with color shifting pigment.

Preferably, the printed pyramids in accordance with this invention have dimensions of 20-100 microns in height with a corresponding base dimension or different dimensions such that the height to base ratio was between 1:5 to 5:1, preferably 1:2 to 2:1, and more preferably between 0.5:1 to 1:0.5 such that the height can vary from 0.5-1.0 and the base can vary from 1.0 to 0.5 in unit less dimensions, one would achieve color by rotation.

The pigment size is adjusted to accommodate the size of the pyramids so that smaller optically variable pigment or other pigments could be on the order of 5 microns for 20 micron pyramids and by way of example, 10 or 20 micron sized pigment is suitable for the 100 micron pyramids.

In the pressures exerted by Intaglio printing, the combination of viscous flow into the pyramidal cavities will tend to orient the particles flat with respect to the face planes of the pyramids. Some particles might be fractured into smaller pieces such that the small platelets still lie parallel to the planes of the surface of the pyramids. Even if the platelets do not lie parallel to the pyramid faces, color by rotation will still occur as other colors will present themselves.

In an embodiment where a three-sided pyramid with three different slope surfaces was printed with color shifting ink, three different colors could be achieved as one rotated the printed image. Obtaining three or more different colors is highly desirable.

The pigment can contain in place of optically variable pigment (OVP), other pigments such as interference mica which have some color shifting with angle, color shifting liquid crystal pigments or even magnetic color shifting OVP and may have in addition to the color shifting pigment, non shifting pigment which would include interference and non-interference pigments.

Figure 19:
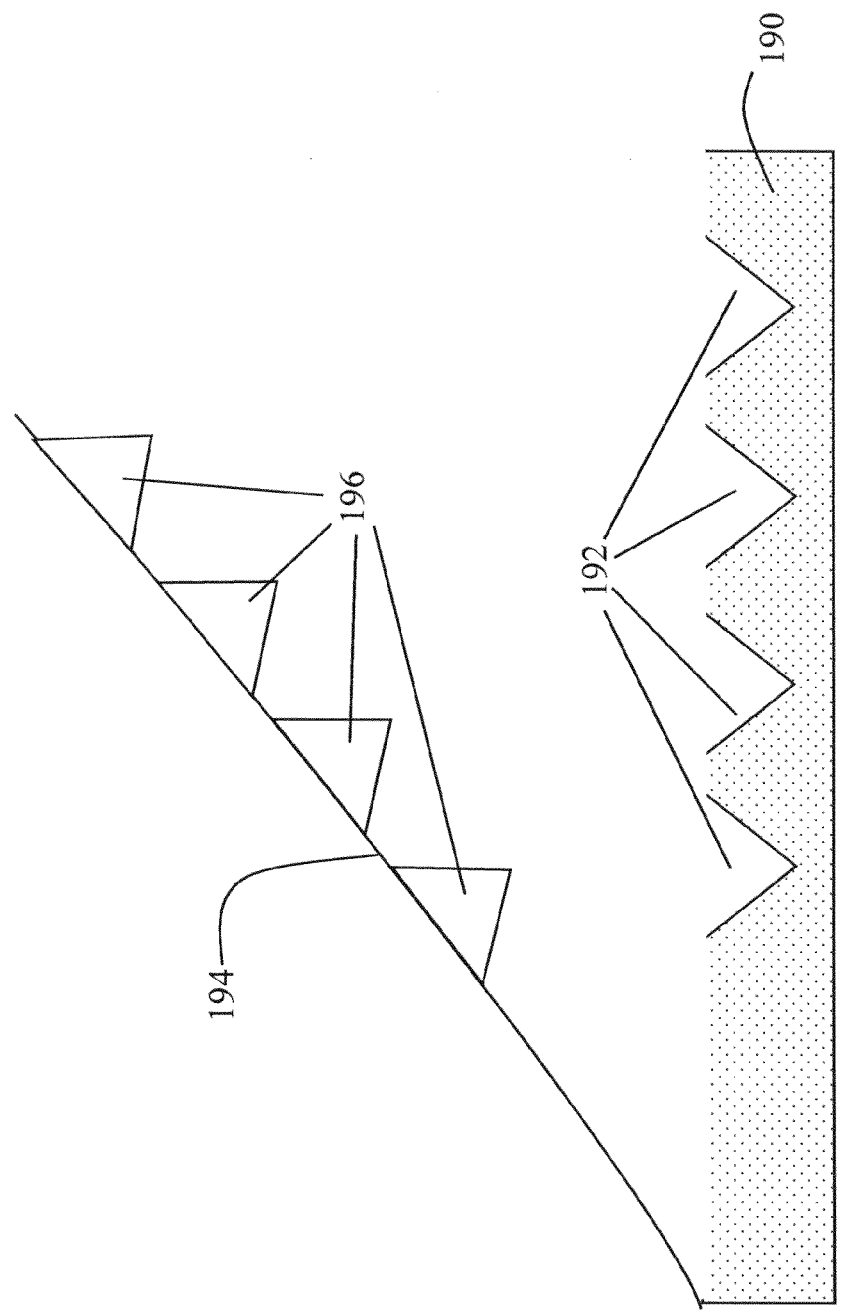
FIG. 19 is a cross sectional drawing of a printing plate and an inked web shown partially removed from the plate.

FIG. 19 is a drawing which shows a printing plate 190 having indentations in the form of indented pyramids 192 and accompanying substrate 194 printed with pyramids 196, wherein the substrate 194 is shown being removed from the plate 190.

The concentration of the flakes within the carrier is in the range 5-50% by weight based on total weight of ink, preferably 20-40% and more preferably 30% for a Intaglio paper wipe ink, and preferably 20-40% and more preferably 20% for a UV silkscreen ink and preferably 20-40% and more preferably 25% for UV flexographic ink. Such concentrations and formulations are shown in WO2007/131833 assigned to SICPA Holding and is incorporated in its entirely by way of reference.

In an alternative embodiment of the invention that varies from the previously described Intaglio-type printing a UV curable ink or an Intaglio ink that has been coated to a thickness of 50-100 microns is embossed with a embossing tool that has on it surface an array of positive pyramidal structures. The spaces between the positive embossing pyramids become the positive printed pyramids in the curable ink after the embossing. In particular, embossing with pyramids having a height of between 5 and 45 microns could occur on a wet high viscosity film as found in an Intaglio ink (UV cured) where the wet film thickness is 50 microns.

Numerous embodiments of the invention have been described and all of these embodiments have similar color changing effects; a color change by rotation, wherein as the substrate is rotated about an axis normal to the substrate, the visible color of the array of pyramids changes. This feature can be used as a security feature on documents or articles to be protected, or can be used as a decorative feature on articles.

What is claimed is:

1. An optically variable device comprising a substrate having an array of structures formed thereon and supported thereby,
   wherein the structures are pyramidal shaped structures comprising an optically variable ink;
   wherein each pyramidal shaped structure has at least three slanted faces; and
   wherein a color shift is seen when viewing the array of the pyramidal shaped structures as substrate is rotated about an axis orthogonal to the substrate,
      wherein the color shift seen when rotating the array of the pyramidal shaped structures results from addition of substantially identical color shifts of individual pyramidal shaped structures.

2. An optically variable device as defined in claim 1 wherein more than one color is seen as the printed pyramidal shaped structures are rotated at least 30 degrees about an axis orthogonal to the substrate.

3. An optically variable device as defined in claim 2, wherein the structures are printed structures.

4. An optically variable device as defined in claim 3 where the optically variable ink comprises a carrier having color shifting flakes therein.

5. An optically variable device as defined in claim 4 wherein the color shifting flakes are multilayer flakes and wherein the average largest dimension of the flakes is less than half of the height of a pyramidal shaped structure they form a part of.

6. An optically variable device as defined in claim 4 where each of the pyramidal structures is less than 150 microns in height.

7. An optically variable device as defined in claim 1, wherein gaps between the structures or structures that differ from the array of structures are provided between structures in the array of structures so as to form visible indicia, and wherein the indicia is sized to be discernable without magnification.

8. An optically variable device as defined in claim 3 having visible indicia distinguishable from the array of pyramidal structures.

9. An optically variable device as defined in claim 4 wherein a height to base ratio of at least 50% of the pyramidal shaped structures is in the range of 0.6 to 0.8.

10. An optically variable device as defined in claim 4 wherein a first plurality of the pyramidal shaped structures are oriented in a first predetermined orientation and wherein a second plurality of the pyramidal shaped structures are oriented in a second different orientation so that the first plurality of structures appear to be a different color than the second plurality of structures.

11. An optically variable device as defined in claim 1, wherein a first group of contiguous pyramidal shaped structures differs from a second group of contiguous structures and wherein one of the first and second groups forms visually distinguishable indicia.

12. An optically variable device as defined in claim 1 wherein each of the faces of a pyramidal shaped structure forms a different angle with the substrate.

13. An optically variable device as defined in claim 1 wherein each of the faces of a pyramidal shaped structure in the array of structures forms a same angle with the substrate.

14. An optically variable device as defined in claim 1 wherein the optically variable ink is comprised of flakes, and wherein at least some of the flakes form a single-cavity Fabry-Perot structure.

15. An optically variable device as defined in claim 1 wherein the optically variable ink is comprised of flakes, and wherein at least some of the flakes each form a multicavity Fabry-Perot structure.

16. An optically variable device as defined in claim 3 wherein a plurality of the pyramidal shaped structures are at least one of tetrahedron pyramids, square pyramids, pentagonal pyramid and a frustum pyramids with flat tops.

17. An optically variable device as defined in claim 1, wherein the optically variable ink includes at least some flakes having a diffractive pattern formed therein.

18. An optically variable device as defined in claim 4 wherein the optically variable flakes are magnetic flakes.

19. An optically variable device as defined in claim 3 wherein the optically variable ink is comprised of liquid crystal polymeric pigments.

20. An optically variable device as defined in claim 1, wherein each of the pyramidal structures is less than 100 microns but greater than 20 microns in height.

21. An optically variable device as defined in claim 3, wherein the printed structures are Intaglio structures printed on the substrate with the optically variable ink.

22. An optically variable device as defined in claim 21, wherein a thickness of the optically variable ink between two neighboring Intaglio structures is small enough, so that substantially no contribution to color of the array of structures is made by a layer of the optically variable ink of that thickness.

23. An optically variable device as defined in claim 21, wherein a thickness of the optically variable ink between two neighboring Intaglio structures is substantially zero.

24. An optically variable device as defined in claim 1, wherein the structures are embossed in a layer of the optically variable ink.

25. An optically variable device as defined in claim 24, wherein the pyramidal structures have a height of 5 to 45 micron per each 50 micron of thickness of the uniform layer of the optically variable ink.

26. An optically variable device as defined in claim 24, wherein the optically variable ink has been UV cured.

* * * * *